US010635607B2

(12) United States Patent
Chaganty et al.

(10) Patent No.: US 10,635,607 B2
(45) Date of Patent: Apr. 28, 2020

(54) METHODS, SYSTEMS AND APPARATUS TO IMPROVE BOOT EFFICIENCY

(71) Applicant: Intel Corporation, Santa Clara, CA (US)

(72) Inventors: Rangasai V. Chaganty, Hillsboro, OR (US); Vincent Zimmer, Tacoma, WA (US); Satya P. Yarlagadda, Bangalore (IN); Giri P. Mudusuru, Portland, OR (US); Jiewen Yao, Shanghai (CN); Xiang Ma, Hillsboro, OR (US); Ravi Rangarajan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 15/198,476

(22) Filed: Jun. 30, 2016

(65) Prior Publication Data
US 2018/0004534 A1 Jan. 4, 2018

(51) Int. Cl.
*G06F 9/44* (2018.01)
*G06F 13/12* (2006.01)
*G06F 9/4401* (2018.01)

(52) U.S. Cl.
CPC ............ *G06F 13/12* (2013.01); *G06F 9/4401* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 8,812,828 | B2* | 8/2014 | Datta | G06F 21/575 |
| | | | | 713/2 |
| 9,836,307 | B2* | 12/2017 | Gupta | G06F 9/4403 |
| 2007/0192611 | A1* | 8/2007 | Datta | G06F 21/57 |
| | | | | 713/176 |
| 2013/0013905 | A1* | 1/2013 | Held | G06F 21/575 |
| | | | | 713/2 |
| 2013/0159608 | A1* | 6/2013 | Shin | G06F 3/0607 |
| | | | | 711/103 |

(Continued)

OTHER PUBLICATIONS

Ask Ubuntu, "boot—Where is the bootloader stored—in ROM, RAM or elsewhere—Ask Ubuntu," Jun. 16, 2016, retrieved from <http://askubuntu.com/questions/173248/where-is-the-bootloader-stored-in-rom-ram-or-elsewhere>, 5 pages.

(Continued)

*Primary Examiner* — Zahid Choudhury
(74) *Attorney, Agent, or Firm* — Hanley, Flight & Zimmerman, LLC

(57) ABSTRACT

Methods, apparatus, systems and articles of manufacture are disclosed to improve boot efficiency. An example apparatus includes a firmware support package (FSP) configuration engine to retrieve an FSP reset (FSP-R) component from a platform memory, a firmware interface table (FIT) manager to assign an entry to a FIT for the FSP-R component and assign respective entries to the FIT for auxiliary FSP components, and an FSP configuration engine to transfer platform control to the FSP-R component to control execution of the auxiliary FSP components in response to a platform reset vector.

25 Claims, 6 Drawing Sheets

(56) References Cited

U.S. PATENT DOCUMENTS

| | | | | |
|---|---|---|---|---|
| 2016/0140683 A1* | 5/2016 | Sun | ......................... | G09G 5/005 345/522 |
| 2017/0090909 A1* | 3/2017 | Guo | .......................... | G06F 8/66 |
| 2019/0042391 A1* | 2/2019 | Menon | .................. | G06F 11/364 |

OTHER PUBLICATIONS

Intel Corporation, "Enabling the Adoption of Intel® Architecture with a Customizable Firmware Solution for Digital Surveillance System Applications," Case Study, Nov. 2015, 4 pages.

Intel Corporation, "Intel® Firmware Support Package Preserves Frameworks," retrieved from <http://www.intel.com/content/www/us/en/intelligent-systems/intel-firmw . . . >, retrieved on Mar. 31, 2016, 8 pages.

Intel Corporation, "Intel® Firmware Support Package," Product Brief, Feb. 2013, 2 pages.

Sun, "Intel Firmware Support Package for the Internet of Things," RTC Magazine, Nov. 2014, retrieved from <http://rtcmagazine.com/articles/view/103818>, retrieved Jun. 16, 2016, 6 pages.

Intel Corporation, "Intel® Firmware Support Package: External Architecture Specification v2.0," Document No. 334423-001US, May 2016, 54 pages.

Benschop, "Flow Boot Loaders Work," May 29, 2003, retrieved from <https://lennartb.home.xs4all.nl/bootloaders/node3.html>, 6 pages.

Chapter 3, "Intel® Firmware Support Package (Intel® FSP)," retrieved Jun. 16, 2016, 30 pages.

Intel Corporation, "Intel® Firmware Support Package (Intel® FSP): A Rapid, Competitive, and Scalable Firmware Solution for Intelligent Systems Ecosystem," Intel Intelligent Systems Summit, 2012, 42 pages.

Zimmer, "Firmware Flexibility using Intel® Firmware Support Package," Apr. 15, 2014, 33 pages.

* cited by examiner

METHODS, SYSTEMS AND APPARATUS TO IMPROVE BOOT EFFICIENCY

FIELD OF THE DISCLOSURE

This disclosure relates generally to platform initialization, and, more particularly, to methods, systems and apparatus to improve boot efficiency.

BACKGROUND

In recent years, platform developers have created specialized hardware devices for user-specific purposes. Some specialized hardware devices have emerged from efforts associated with the Internet of Things (IoT), which typically includes specialized hardware devices having a relatively low price point to meet specific information gathering objectives.

In some examples, the IoT applications involve embedded systems that are proprietary and/or otherwise closed systems with dedicated functionalities. As such, these closed systems may have unique and/or otherwise customized firmware requirements during boot and/or runtime execution.

DETAILED DESCRIPTION

Figure 1:
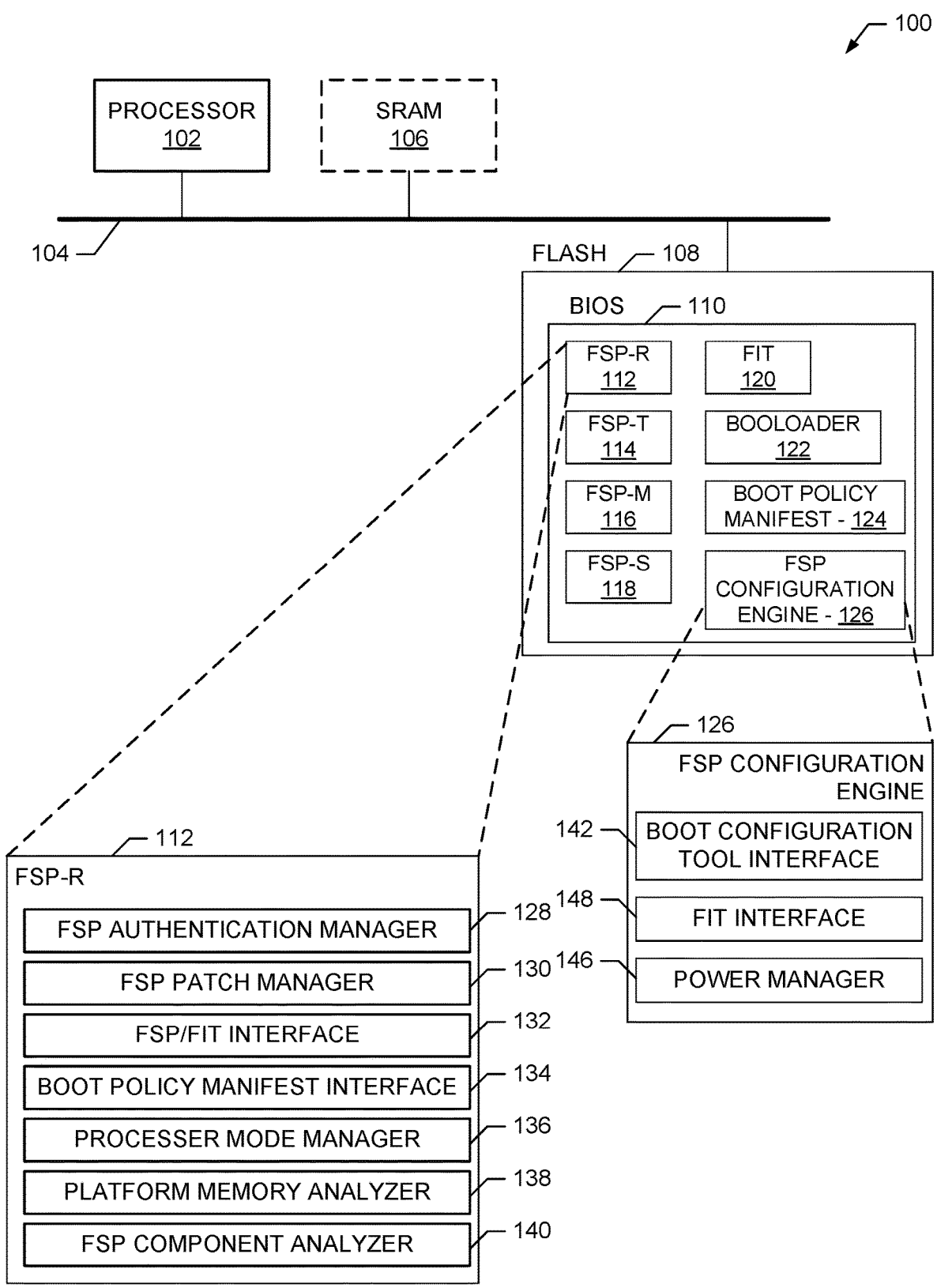
FIG. 1 is a schematic illustration of an example platform including a firmware support package reset component to improve boot efficiency.

Developers of processor-based devices require such devices to boot in a manner consistent with specifications outlined by a manufacturer of the type of processor selected by the developers. In examples related to personal computers (PCs), boot operations may be managed by basic input/output systems (BIOS) and/or unified extensible firmware interface (UEFI). As used herein, references to "BIOS" refer to the process and/or mechanism by which a platform is booted from a previously powered-off state. Generally speaking, boot operations occur immediately after power is applied to a platform, but prior to an operational point where an operating system (OS) has control of that platform. The boot operations initialize platform hardware (e.g., memory, buses, drives, keyboards, displays, etc.) so that such hardware is in a state to be handed-off to the OS.

While the PC industry has a mature market for BIOS vendors, other industries may not produce devices that work with current BIOS vendor solutions. Internet-of-Things (IoT) devices may include specialized platforms having components and/or configurations that do not align with the generalized expectations of BIOS vendor solutions. As such, developers of IoT devices typically design, code and test customized platform boot solutions (e.g., bootloaders). In some examples, customizing the BIOS involves engaging BIOS vendors for development expertise and/or licensing to use one or more BIOS solution(s). Even in circumstances where a BIOS vendor agrees to license one or more solutions to facilitate platform booting, such solutions may remain proprietary, thereby leaving the platform developer with a degree of dependence upon outside expertise rather than a controlled and/or otherwise fully owned platform solution.

The platform developer is typically knowledgeable of key aspects of the platform being developed, particularly with regard to on-board sensors and/or devices. However, many platform developers still rely on third party vendors for processing resources (e.g., processors, microprocessors, microcontrollers and/or, more generally, processing silicon). While the platform developers may have expertise in most aspects of their platform, gaining similar expertise and/or knowledge regarding the processing resources and/or processing resource initialization requirements may require adherence to voluminous and/or complicated processing vendor specifications and manuals.

To relinquish valuable developer development time, firmware support package (FSP) components (e.g., binaries, application programming interfaces (APIs)) facilitate a focused configuration effort of processing resources of a platform. In some examples, the FSP components are associated with the Intel® Firmware Support Package (FSP). Rather than require the developer to become an expert in third party processing resources, the FSP components allow the processing resources to be properly initialized during a booting phase of the platform through a bootloader (e.g., coreboot or EDK II). Upon completion of processing resource initialization via the FSP components, developer-specific boot instructions may be implemented to continue with initialization of one or more other portions of the platform for which the developer likely has expertise.

Example FSP components include a temporary memory (e.g., random access memory (RAM)) initialization component, referred to herein as "FSP-T," which establishes temporary memory for a platform of interest. Generally speaking, when a platform is first powered-on there is no available memory within which to establish a stack. Without a stack, programming instructions for an associated processor must be written in an assembly format, which is relatively less convenient and/or efficient when compared to a native language type, such as C. In some examples, FSP-T uses a portion of processor cache as the temporary memory.

Example FSP components also include a memory initialization component, referred to herein as "FSP-M," which initializes permanent memory in lieu of previously created temporary memory, thereby relinquishing the cache for processor utilization purposes. Additionally, example FSP components also include a silicon initialization component, referred to herein as "FSP-S," which initializes processor silicon, such as a central processing unit (CPU), input/output (I/O) controller, etc. Because processor silicon is complex and requires strict adherence to manufacturer initialization specifications and/or processes, some platform developers do not possess the expertise necessary for proper silicon initialization. Accordingly, the example FSP-S component encapsulates necessary initialization information and/or procedures that, when integrated within a platform bootloader, allows the platform to properly initialize.

While example FSP components described above may assist the platform developer during boot operations, examples disclosed herein facilitate consistent management and/or guidance of such example FSP components. Traditionally, the example platform developer is required to build a boot process that includes appropriate ones of the FSP components, which are specific to silicon to be used on the platform. Examples disclosed herein verify that one or more FSP components are compatible with platform silicon. Additionally, some platforms include particular memory types that may be available for stack initialization, thereby removing a need for the example FSP-T component to be invoked. Memory initialization is one of the largest consumers of time during a boot process of a platform, thus invoking one or more additional initialization processes when not necessary adds to an overall boot duration of the platform.

FIG. 1 is a portion of an example platform 100 to improve boot efficiency. In the illustrated example of FIG. 1, the platform 100 includes a processor 102 communicatively connected to a bus 104 that is communicatively connected to static random access memory (SRAM) 106 and flash memory 108. In some examples, the platform 100 may not include the example SRAM 106, as described in further detail below. While the illustrated example of FIG. 1 shows the SRAM 106 outside the structure of the example processor 102, examples disclosed herein are not limited thereto. In some examples, the SRAM 106 may be part of a die of the example processor 102, and may operate as a type of cache RAM. In other examples, the platform 100 may not include the example SRAM 106 and, instead, include other memory that is not initialized, thereby requiring one or more services of a memory initialization component to get that memory ready for use. Generally speaking, the example SRAM 106 is a relatively expensive type of RAM that is relatively faster than dynamic RAM (DRAM), does not require periodic refresh cycle(s), and can retain memory contents in view of a loss of power (e.g., non-volatile SRAM types).

The example flash memory 108 includes a basic input/output system (BIOS) 110 to facilitate, in part, boot operation(s) of the example platform 100. In the illustrated example of FIG. 1, the BIOS 110 includes an FSP-reset (FSP-R) component 112, and one or more auxiliary FSP components, such as an FSP-temporary (FSP-T) component 114, an FSP-memory initialization (FSP-M) component 116 and an FSP-silicon (FSP-S) component 118. Additionally, the example BIOS 110 includes an example firmware interface table (FIT) 120, an example bootloader 122, an example boot policy manifest (BPM) 124, and an example FSP configuration engine 126.

The example FSP-R component 112 includes an example FSP authentication manager 128, an example FSP patch manager 130, an example FSP/FIT interface 132, an example BPM interface 134, an example processor mode manager 136, an example platform memory analyzer 138, and an example FSP component analyzer 140. The example FSP configuration engine 126 includes an example binary configuration tool (BCT) interface 142, an example power manager 146, and an example FIT manager 148.

In operation, the example processor 102 determines whether a power-on condition has occurred, such as by way of an invocation of a reset address. If so, the example reset address points to code located somewhere on the example platform 100 to begin platform initialization. In some examples, the reset address points to a firmware interface table (FIT) 120, which is an example data structure containing address information for one or more firmware volumes (FVs), such as an FV associated with the example FSP-R component 112 and/or an FV associated with one or more of the example auxiliary FSP components (e.g., the example FSP-T component 114, the example FSP-M component 116, the example FSP-S component 118, etc.). In the event the example FIT 120 identifies a corresponding FSP-R component 112, then the example FSP authentication manager authenticates the FSP-R component 112 and begins platform initialization, as described in further detail below. However, in the event the example FIT 120 does not identify a corresponding FSP-R component 112, then the example FSP configuration engine 126 is invoked to determine whether to configure the example platform 100 to employ and/or otherwise utilize an FSP-R component 112.

In some examples, the FSP configuration engine 126 initiates platform customization to employ and/or otherwise utilize the FSP-R component 112, such as a response to user installation of a binary configuration tool (BCT) that installs one or more of the FSP-T component 114 (e.g., to initialize temporary memory), the FSP-M component 116 (e.g., to initialize permanent memory), and/or the FSP-S component 118 (e.g., to initialize platform silicon, such as a processor and/or CPU). The example BCT interface 142 invokes the BCT utilized by the user when one or more FSP components were added to the example platform 100. In some examples, the BCT interface 142 retrieves installation details of the FSP components, such as version numbers, address location values (e.g., offset values), and/or target silicon to which the FSP components are tailored and/or otherwise designed to configure. As described in further detail below, acquiring such installation details facilitates an ability to verify that correct FSP components have been installed by a platform manager (e.g., user) in view of specific platform hardware (e.g., a specific processor and/or processor components).

Figure 2:
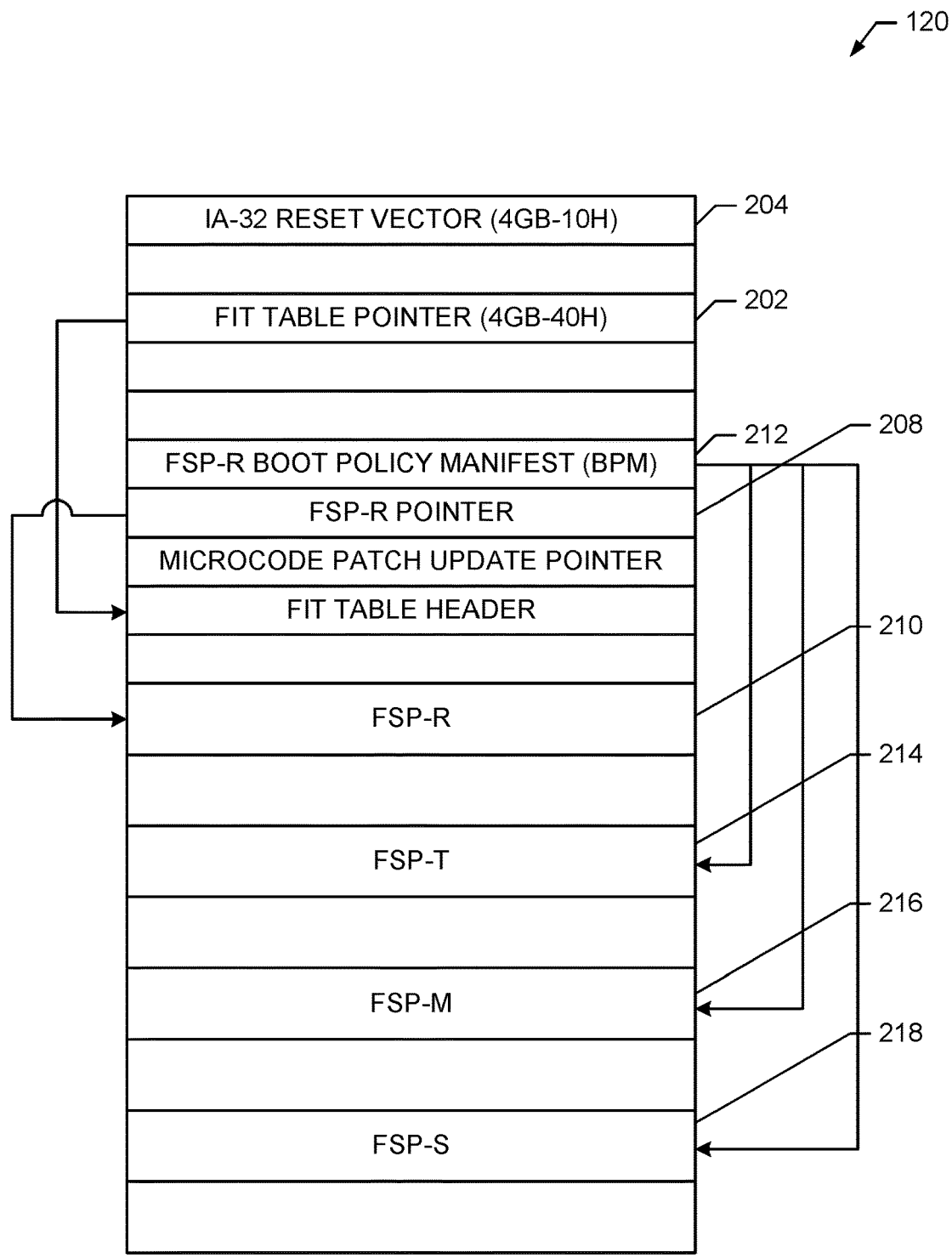
FIG. 2 is an example firmware interface table generated by the example platform to improve boot efficiency.

The example FIT manager 148 accesses the example FIT 120 located in the BIOS 110 and assigns a starting address for the FSP-R component 112 so that it can begin execution in response to a power-up state (after previously being powered-off, or in response to a power-reset request). Generally speaking, the example FSP-R component 112 facilitates the ability to dispatch the proper auxiliary FSP components (e.g., verify compatibility with platform silicon), a particular order of dispatch (e.g., an execution order of the example auxiliary FSP components), and/or blocking dispatch of particular auxiliary FSP components when they may not be needed during platform initialization. In other words, the example FSP-R component allows deployment of the correct auxiliary FSP components for the correct platform silicon (e.g., processor). Additionally, the example FIT manager 148 assigns starting addresses in the example FIG. 120 to point to corresponding auxiliary FSP components, such as the example FSP-T component 114, the example FSP-M component 116 and/or the example FSP-S component 118. FIG. 2 illustrates the example FIT 120 of FIG. 1. In the illustrated example of FIG. 2, the FIT 120 includes a FIT table pointer starting address 202 configured by the example FIT manager 148. In some examples the FIT 120 includes a legacy reset vector 204, and the example FIT manager 148 may modify the FIT 120 to redirect to the example FIT starting address 202. The example FIT manager 148 updates the FIT 120 to include appropriate starting addresses for FVs of interest, such as a FIT header address 206, an FSP-R pointer 208 directed to an FSP-R starting address 210, and a BPM pointer 212 to identify an FSP-T starting address 214, an FSP-M starting address 216, and an FSP-S starting address 218. After the example FIT 120 has been configured to employ and/or otherwise utilize the example FSP-R component 112, the example power manager 146 cycles power to the example platform 100.

Upon power-on of the example platform 100, the example processor 102 reset vector points to the example FIT pointer starting address 202 and locates the example FSP-R component starting address 210. To verify that the example FSP-R component 112 is trusted, the example FSP authentication manager 128 extends trust by performing authentication of the FSP-R component 112, such as via a private key/public key pairing. For example, the FSP-R component 112 may have been created in view of a private key available only to the manufacturer so that a comparison hash can be performed to verify authenticity. In the event the example FSP-R component 112 does not pass an authentication test, then the example FSP authentication manager does not allow further execution, operation and/or control by the example FSP-R component 112. On the other hand, in the event the example FSP-R component 112 passes one or more authentication test(s), then the example FSP patch manager 130 determines whether a patch is needed.

In some examples, the manufacturer of the silicon being used on the example platform 100 desires an updated version of the FSP-R component 112 to be used. Reasons for distributing the updated version of the FSP-R component 112 (e.g., the patch) include correction of discovered bugs (e.g., coding errors, design flaws, etc.), updated features and/or alternate flow directives of one or more FSP components (e.g., FSP-T 114, FSP-M 116, FSP-S 118). The example FSP authentication manager 128 authenticates patch component(s), and in some examples the new FSP-R component may include an alternate/new address to be identified in the example FIT 120, which is updated by the example FSP/FIT interface 132. To enable any new authenticated patch, the example FSP-R component 112 may invoke a platform power reset instruction so that the example FIT 120 can point to and begin application of the updated/patched FSP-R component 112.

However, in the event the example FSP patch manager 130 determines that a patch is not needed, then the example FSP configuration engine 126 transfers control to the example FSP-R component 112, and the example BPM interface 134 locates and verifies the boot policy manifest (e.g., using an original equipment manufacturer (OEM) public key). In the event the BPM 124 does not pass one or more verification test(s), then the example FSP authentication manager 128 instructs the example platform 100 to proceed with a legacy boot process, thereby bypassing the example FSP-R component 112. On the other hand, in response to the example BPM 124 passing one or more verification test(s), the example FSP-R component 112 facilitates an improved platform initialization process, as described in further detail below.

The example processor mode manager 136 switches the example processor 102 to an alternate bit mode (e.g., a thirty-two (32) bit mode) so that stack access may occur and, thus, FVs can be executed using one or more native languages rather than low-level assembly code. The example platform memory analyzer 138 determines whether the platform 100 requires one or more services of the example FSP-T component 114. For example, while a user of the example platform 100 may have employed a binary configuration tool (BCT) to install one or more FSP components that are associated with the platform silicon (e.g., the example processor 102), one or more of those FSP components may not actually be required during one or more phases of platform initialization. In some examples, the platform includes the example SRAM 106 in an initialized state. If so, then a default attempt to invoke the example FSP-T component 114 results in wasted processing efforts and longer boot durations for the example platform 100. Accordingly, the example platform memory analyzer 138 reduces wasted processor cycles and reduces platform boot durations by preventing the invoking of the example FSP-T component 114 when the example platform 100 already includes a suitable memory (e.g., the SRAM 106) that is initialized.

When temporary memory has been established (e.g., either by application of the example FSP-T component 114 or by virtue of an existing initialized memory (e.g., SRAM 106)), the example platform memory analyzer 138 sets up a stack in the temporary memory so that any subsequent calls to one or more FVs can take advantage of native language code. The example FSP component analyzer 140 locates the example FSP-M component 116 that was installed via the BCT. As described above, while temporary memory is established and utilized for early phases of platform booting activity, one or more subsequent phases establishes permanent memory, such as RAM. The example FSP-M component 116 is chartered with the responsibility of establishing the permanent memory and, once established, the example platform memory analyzer 138 migrates the previously established temporary memory to the permanent memory. As described above, in some circumstances a platform may have one or more previously established and/or otherwise initialized permanent memory resources available for platform use. If so, then the example FSP component analyzer 140 may block invocation of the example FSP-M component 116 in an effort to further conserve processing resources and reduce initialization duration.

The example FSP component analyzer 140 locates the example FSP-S component 118 that was installed via the BCT. The example FSP-S component 118 is chartered with the responsibility of initializing the silicon used by the example platform 100. As described above, to reduce one or burdens on the user when developing the platform 100, the FSP-S component 118 handles silicon-specific initialization tasks so that the developer can focus on one or more functional objectives of the platform (e.g., IoT sensor reading objectives). After the example FSP-S component 118 completes silicon initialization, the example BPM interface 134 hands control to the OEM boot block for boot initialization task(s) associated with other portions of the example platform.

While an example manner of implementing the platform of FIG. 1 is illustrated in FIGS. 1 and 2, one or more of the elements, processes and/or devices illustrated in FIGS. 1 and/or 2 may be combined, divided, re-arranged, omitted, eliminated and/or implemented in any other way. Further, the example FSP-R component 112, the example auxiliary FSP components (e.g., the example FSP-T component 114, the example FSP-M component 116, the example FSP-S component 118), the example FIT 120, the example FSP configuration engine 126, the example FSP authentication manager 128, the example FSP patch manager 130, the example FSP/FIT interface 132, the example BPM interface 134, the example processor mode manager 136, the example platform memory analyzer 138, the example FSP component analyzer 140, the example BCT interface 142, the example power manager 146, the example FIT manager 148 and/or, more generally, the example platform 100 of FIGS. 1 and 2 may be implemented by hardware, software, firmware and/or any combination of hardware, software and/or firmware. Thus, for example, any of the example FSP-R component 112, the example auxiliary FSP components (e.g., the example FSP-T component 114, the example FSP-M component 116, the example FSP-S component 118), the example FIT 120, the example FSP configuration engine 126, the example FSP authentication manager 128, the example FSP patch manager 130, the example FSP/FIT interface 132, the example BPM interface 134, the example processor mode manager 136, the example platform memory analyzer 138, the example FSP component analyzer 140, the example BCT interface 142, the example power manager 146, the example FIT manager 148 and/or, more generally, the example platform 100 of FIGS. 1 and 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example FSP-R component 112, the example auxiliary FSP components (e.g., the example FSP-T component 114, the example FSP-M component 116, the example FSP-S component 118), the example FIT 120, the example FSP configuration engine 126, the example FSP authentication manager 128, the example FSP patch manager 130, the example FSP/FIT interface 132, the example BPM interface 134, the example processor mode manager 136, the example platform memory analyzer 138, the example FSP component analyzer 140, the example BCT interface 142, the example power manager 146, the example FIT manager 148 and/or, more generally, the example platform 100 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example FSP-R component 112, the example auxiliary FSP components (e.g., the example FSP-T component 114, the example FSP-M component 116, the example FSP-S component 118), the example FIT 120, the example FSP configuration engine 126, the example FSP authentication manager 128, the example FSP patch manager 130, the example FSP/FIT interface 132, the example BPM interface 134, the example processor mode manager 136, the example platform memory analyzer 138, the example FSP component analyzer 140, the example BCT interface 142, the example power manager 146, the example FIT manager 148 and/or, more generally, the example platform 100 of FIGS. 1 and 2 may include one or more elements, processes and/or devices in addition to, or instead of, those illustrated in FIGS. 1 and/or 2, and/or may include more than one of any or all of the illustrated elements, processes and devices.

Figure 3A:
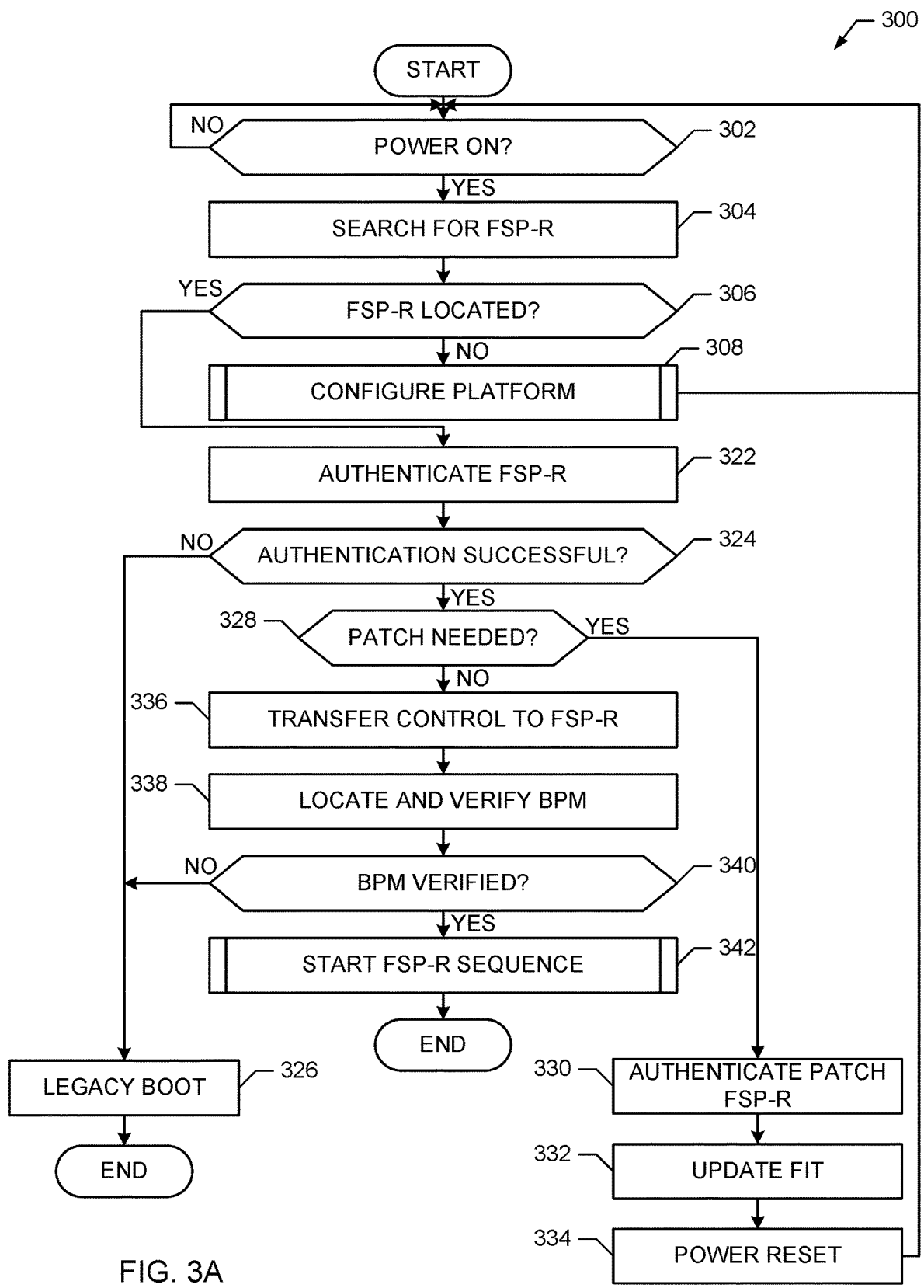
FIGS. 3A, 3B and 4 are flowcharts representative of example machine readable instructions that may be executed to implement the example firmware support package reset component, the example configuration engine and/or the example platform of FIG. 1.
Figure 3B:
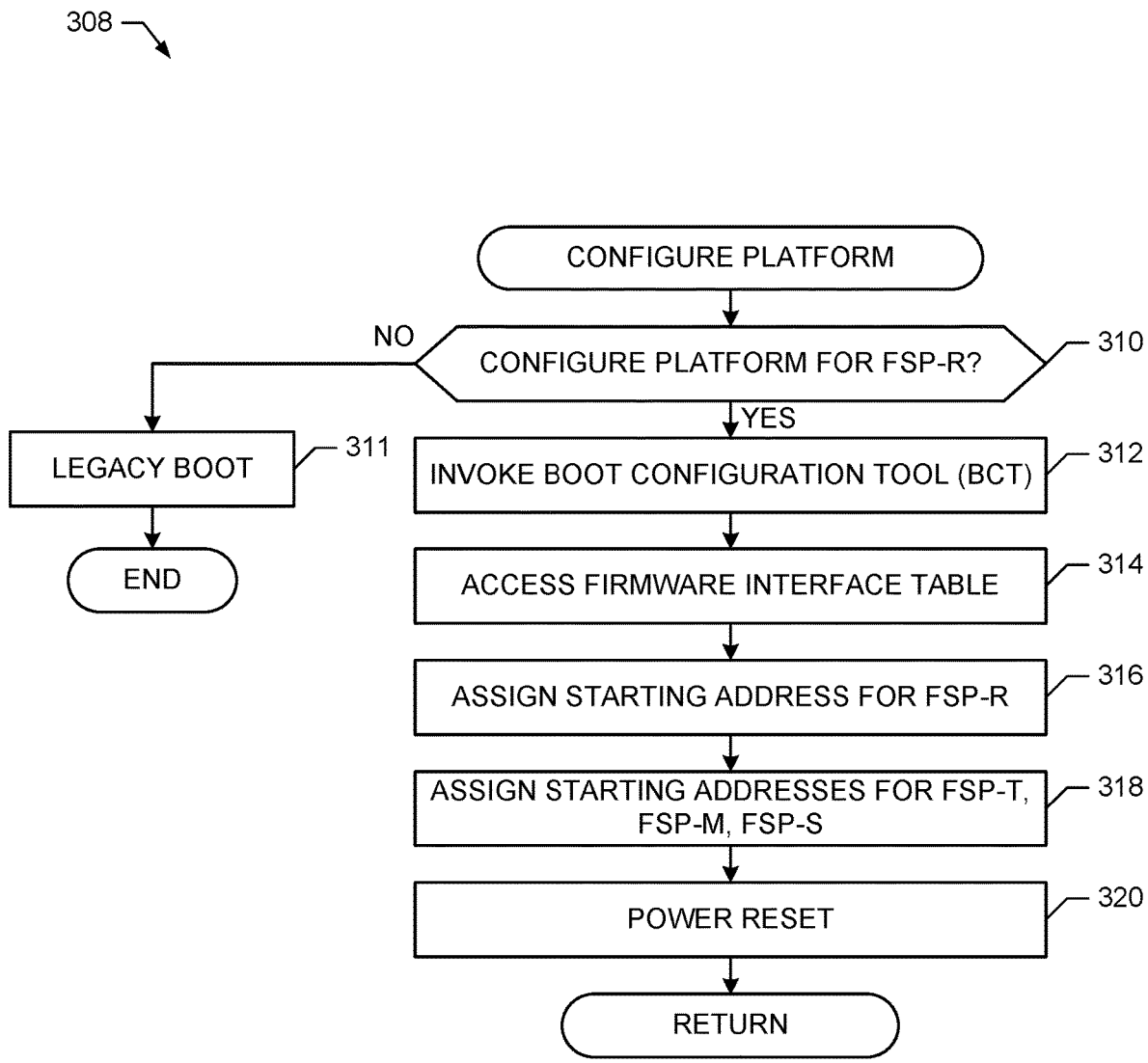
Figure 4:
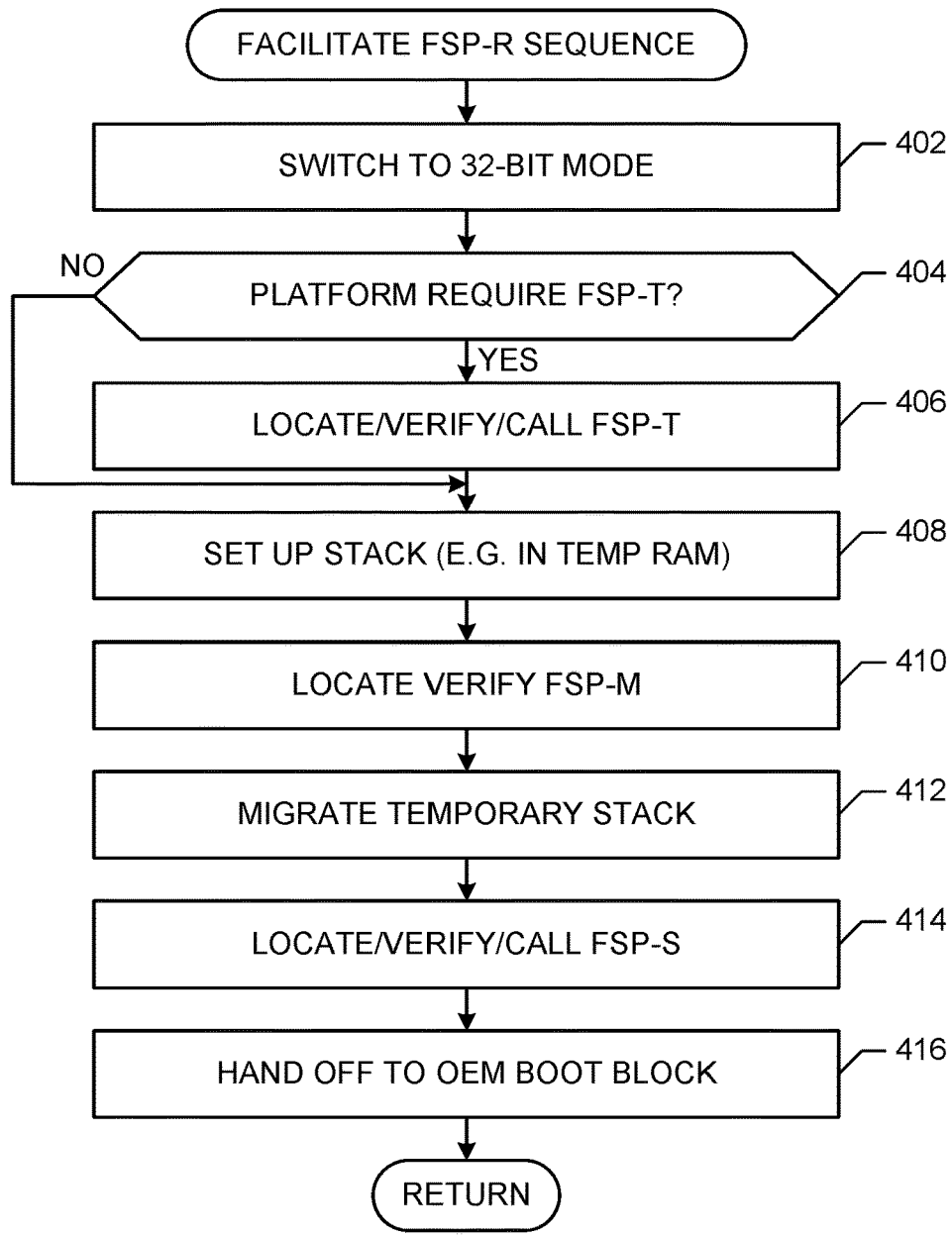

Flowcharts representative of example machine readable instructions for implementing the platform 100 of FIG. 1 is shown in FIGS. 3A, 3B and 4. In these examples, the machine readable instructions comprise a program for execution by a processor such as the processor 512 shown in the example processor platform 500 discussed below in connection with FIG. 5. The program(s) may be embodied in software stored on a tangible computer readable storage medium such as a CD-ROM, a floppy disk, a hard drive, a digital versatile disk (DVD), a Blu-ray disk, or a memory associated with the processor 512, but the entire program(s) and/or parts thereof could alternatively be executed by a device other than the processor 512 and/or embodied in firmware or dedicated hardware. Further, although the example program(s) is/are described with reference to the flowchart illustrated in FIGS. 3A, 3B and 4, many other methods of implementing the example platform 100 may alternatively be used. For example, the order of execution of the blocks may be changed, and/or some of the blocks described may be changed, eliminated, or combined.

As mentioned above, the example processes of FIGS. 3A, 3B and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3A, 3B and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3A begins at block 302 where the example processor 102 determines whether a power-on condition has occurred and, if so, the example FIT 120 searches for an FSP-R component 112 (block 304). In the event an FSP-R component 112 is not identified in the FIT 120 (block 306), then the FIT 120 may not yet be configured to operate with the FSP-R component 112 and/or one or more other FSP components, such as the example FSP-T component 114, the example FSP-M component 116 and/or the example FSP-S component 118. The example FSP configuration engine 126 determines whether the example platform 100 is to be configured to employ the FSP-R component 112 (block 308), as described below in connection with FIG. 3B.

In the illustrated example of FIG. 3B, the example FSP configuration engine 126 determines whether the platform is to be configured to employ the FSP-R component 112 (block 310) and, if not, control of the platform is directed to a legacy boot process (block 311). On the other hand, in the event the platform is to be configured to employ the FSP-R component 112 (block 310), then the example FSP configuration engine 126 retrieves the FSP-R component 112 stored in the example flash memory 108 (e.g., stored within the example BIOS 110) and the example BCT interface 142 invokes the BCT (block 312), which was utilized by the user on a prior occasion when one or more FSP components were added to the example platform 100. This facilitates information gathering of the FSP components that have been installed on the platform 100, such as FSP component names, offset address information (e.g., to be added to the example FIT 120), etc. The example FIT manager 148 accesses the FIT 120 (block 314), assigns a starting address for the example FSP-R component 112 (block 316), and assigns starting address pointers for the other FSP components (block 318), such as the example FSP-T 114, the example FSP-M component 116, and/or the example FSP-S component 118. Upon completion of configuration of the example FIT 120, the example power manager 146 invokes a power-reset directive for the platform 100 (block 320) so that the example FSP-R component 112 can be invoked in response to the processor reset vector.

Returning to the illustrated example of FIG. 3A, in the event the example FSP-R component 112 is located in the example FIT 120 (block 306) (e.g., because the example FSP-R component 112 has previously been configured on the platform 100), the example FSP authentication manager 128 performs an authentication test of the example FSP-R component 112 (block 322). In the event the authentication test fails (block 324), then control is directed to a legacy boot process for concern that the FSP-R component 112 cannot be trusted (block 326). However, in the event the authentication test is successful (block 324), then the example FSP patch manager 130 determines if a patch is needed (block 328). For example, when a manufacturer of the example FSP-R component 112 has an updated version for distribution, such as an updated FSP-R component 112 installed via a boot configuration tool on a prior occasion, a flag in the example FSP patch manager 130 may be set to initiate a patch update process (block 328). As described above, updated versions of the FSP-R component 112 may be distributed in view of design flaw corrections, feature improvements and/or other changes, thereby allowing the processor 102 microcode to point to a correct/updated version, as needed.

The example FSP authentication manager 128 authenticates the patched version of the example FSP-R component 112 (block 330), and the example FSP/FIT interface 132 updates the example FIT 120 to refer-to and/or otherwise reference the patched version of the FSP-R component 112 (block 332). The example FSP patch manager 130 then invokes a platform power reset directive (block 334), and control returns to block 302.

Returning to block 328, in the event a patch is not needed, then the example FSP configuration engine 126 transfers control to the FSP-R component 112 (block 336) and the example BPM interface 134 locates and verifies the example BPM 124 (block 338) (e.g., using an OEM provided public key). If the verification of the example BPM is not successful (block 340), then the example FSP authentication manager 128 directs control to a legacy boot process out of concern that the BPM cannot be trusted (block 326). On the other hand, in the event the BPM is verified (block 340), then the example FSP-R component 112 initiates FSP-R sequencing (block 342), as described below in connection with FIG. 4.

In the illustrated example of FIG. 4, the example processor mode manager 136 switches the example processor 102 to operate in a thirty-two (32) bit mode (block 402) so that FVs can be executed using one or more native languages rather than low-level assembly code. The example platform memory analyzer 138 determines whether the example FSP-T component 114 is needed (block 404). As described above, memory initialization activities of platforms is one of the most time-consuming boot related activities. Accordingly, examples disclosed herein facilitate a manner to evaluate the need for such activities in view of potentially available platform resources, such as already available memory in an initialized state (e.g., SRAM). When such resources are found, examples disclosed herein facilitate an opportunity to restrict, block and/or otherwise prevent unnecessary initialization operation(s) from being executed, thereby conserving processing resources and reducing platform initialization duration.

In the event the example FSP-T component 114 is to be invoked (block 404), then the example FSP component analyzer 140 locates and invokes the FSP-T component 114 (block 406) to initialize temporary memory. The example platform memory analyzer 138 sets-up a stack in the temporary memory (block 408) for use by one or more FVs. In some examples, each FSP component may be tested to confirm that it is the correct FSP component in view of silicon resources of the example platform 100 (block 406). For example, while the user may have previously invoked the boot configuration tool for the purpose of installing one or more FSP components, the possibility exists that an incorrect FSP component has been installed. If so, then the example FSP component analyzer 140 may invoke an error message and/or divert control to a legacy boot process until appropriate FSP component(s) can be identified and installed on the platform 100 (e.g., stored in the example flash memory 108). In other examples, FSP component verification checks may occur in connection with the example program 308 of FIG. 3B.

The example FSP component analyzer 140 locates and invokes the example FSP-M component 116 (block 410) to set up permanent memory, and the example platform memory analyzer 138 migrates the temporary stack to the permanent memory (block 412). As described above, the example FSP component analyzer 140 may perform another verification check to make sure that the appropriate FSP component(s) are being used in view of compatible platform resource(s) (block 410). The example FSP component analyzer 140 locates and invokes the example FSP-S component 118 (block 414) to initialize the silicon (e.g., the processor 102) used by the example platform 100. Upon completion of silicon initialization (block 414), the example BPM interface 134 hands off control to the OEM boot block to facilitate initialization of one or more remaining platform 100 resources (block 416).

Figure 5:
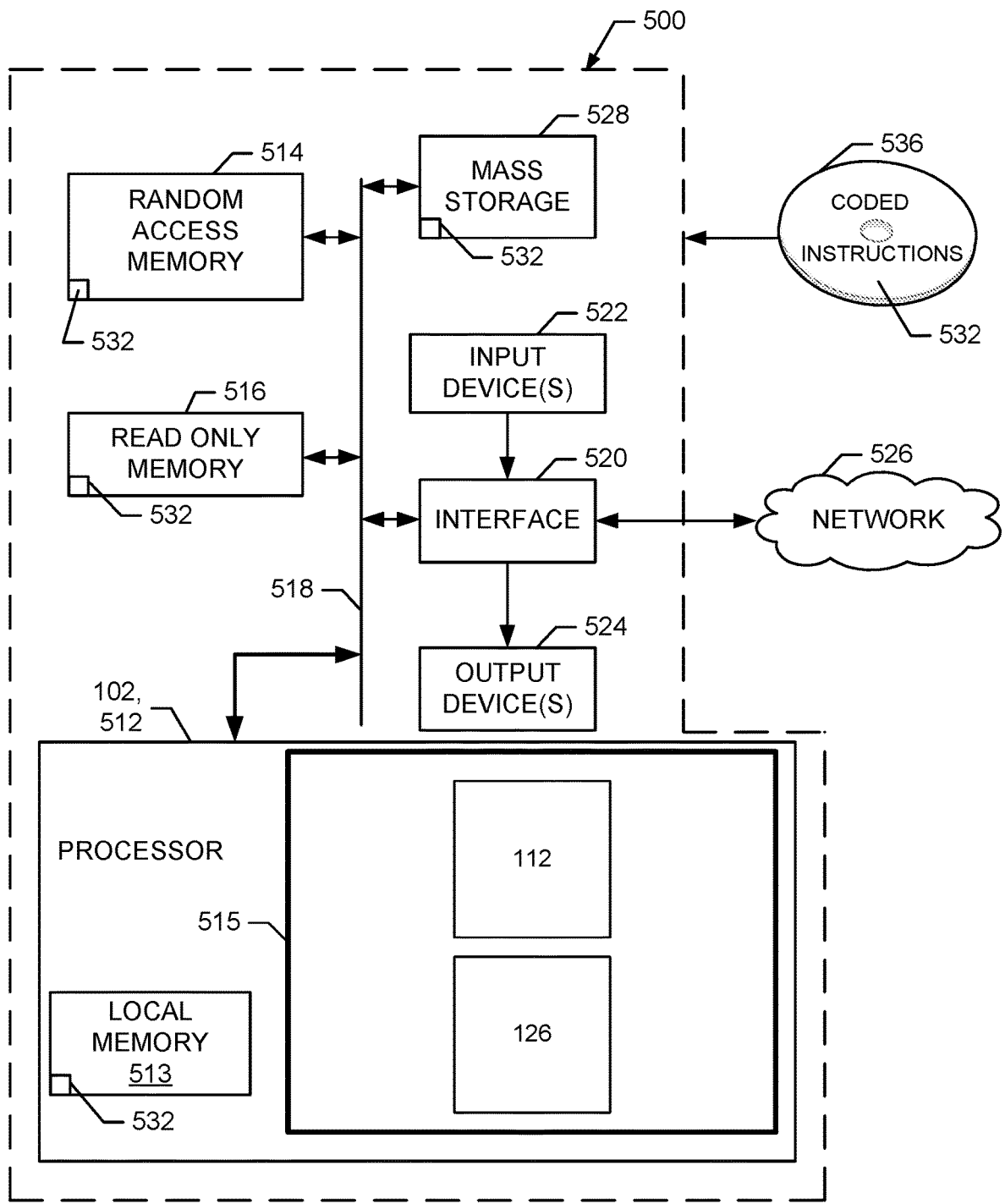
FIG. 5 is a block diagram of an example processor platform structured to execute the example machine readable instructions of FIGS. 3A, 3B and 4 to implement the example firmware support package reset component, the example configuration engine and/or the example platform of FIG. 1.

FIG. 5 is a block diagram of an example processor platform 500 capable of executing the instructions of FIGS. 3A, 3B and/or 4 to implement the FSP-R component 112, the FSP configuration engine 126 and, more generally, the platform 100 of FIG. 1. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device, such as IoT devices.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3A, 3B and/or 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture improve an initialization efficiency of a platform. In particular, examples disclosed herein permit control of one or more auxiliary FSP components during a boot initialization process of the platform, verify that a platform manager is using one or more correct auxiliary FSP components, and controls an order of which ones of the auxiliary FSP components are executed during the platform initialization. Additionally, examples disclosed herein evaluate platform resources and/or platform resource capabilities to block and/or otherwise prevent execution of one or more auxiliary FSP components to improve (reduce) a duration of the platform initialization process.

Example methods, apparatus, systems and articles of manufacture to improve boot efficiency are disclosed herein. Further examples and combinations thereof include the following.

Example 1 is an apparatus to improve platform efficiency including a firmware support package (FSP) configuration engine to retrieve an FSP reset (FSP-R) component from a platform memory, a firmware interface table (FIT) manager to assign an entry to a FIT for the FSP-R component and assign respective entries to the FIT for auxiliary FSP components, and an FSP configuration engine to transfer platform control to the FSP-R component to control execution of the auxiliary FSP components in response to a platform reset vector.

Example 2 includes the apparatus as defined in example 1, further including a platform memory analyzer to identify available platform resources associated with respective ones of the auxiliary FSP components.

Example 3 includes the apparatus as defined in example 2, further including an FSP component analyzer to reduce a boot duration of the platform by bypassing one of the respective ones of the auxiliary FSP components when respective ones of the available platform resources are available.

Example 4 includes the apparatus as defined in example 2, further including an FSP component analyzer to invoke one of the respective ones of the auxiliary FSP components when respective ones of the available platform resources are unavailable.

Example 5 includes the apparatus as defined in example 1, wherein the FSP-R component is to control an execution order of the auxiliary FSP components during platform boot.

Example 6 includes the apparatus as defined in example 1, further including an FSP component analyzer to verify compatibility between respective ones of the auxiliary FSP components and a platform processor.

Example 7 includes the apparatus as defined in example 1, wherein the FSP-R component is to assign a processor of the platform to an alternate bit mode to facilitate stack access.

Example 8 includes the apparatus as defined in example 7, wherein the alternate bit mode includes a 32-bit mode.

Example 9 includes the apparatus as defined in example 1, further including an FSP patch manager to update the FSP-R component in response to a patch request.

Example 10 includes the apparatus as defined in example 9, further including an FSP authentication manager to authenticate an updated FSP-R component with a public key.

Example 11 includes the apparatus as defined in example 10, further including an FSP/FIT interface to update the FIT with an updated entry for the updated FSP-R component.

Example 12 is a method to improve platform efficiency, including retrieving, with an instruction by a processor, a firmware support package (FSP) reset (FSP-R) component from a platform memory, assigning, with an instruction by the processor, an entry to a firmware interface table (FIT) for the FSP-R component, assigning, with an instruction by the processor, respective entries to the FIT for auxiliary FSP components, and transferring, with an instruction by the processor, platform control to the FSP-R component to control execution of the auxiliary FSP components in response to a platform reset vector.

Example 13 includes the method as defined in example 12, further including identifying available platform resources associated with respective ones of the auxiliary FSP components.

Example 14 includes the method as defined in example 13, further including reducing a boot duration of the platform by bypassing one of the respective ones of the auxiliary FSP components when respective ones of the available platform resources are available.

Example 15 includes the method as defined in example 13, further including invoking one of the respective ones of the auxiliary FSP components when respective ones of the available platform resources are unavailable.

Example 16 includes the method as defined in example 12, further including controlling an execution order of the auxiliary FSP components during platform boot.

Example 17 includes the method as defined in example 12, further including verifying compatibility between respective ones of the auxiliary FSP components and a platform processor.

Example 18 includes the method as defined in example 12, further including assigning a processor of the platform to an alternate bit mode to facilitate stack access.

Example 19 includes the method as defined in example 18, wherein the alternate bit mode includes a 32-bit mode.

Example 20 includes the method as defined in example 12, further including updating the FSP-R component in response to a patch request.

Example 21 includes the method as defined in example 20, further including authenticating an updated FSP-R component with a public key.

Example 22 includes the method as defined in example 21, further including updating the FIT with an updated entry for the updated FSP-R component.

Example 23 is a tangible computer-readable medium comprising instructions which, when executed, cause a processor to at least retrieve a firmware support package (FSP) reset (FSP-R) component from a platform memory, assign an entry to a firmware interface table (FIT) for the FSP-R component, assign respective entries to the FIT for auxiliary FSP components, and transfer platform control to the FSP-R component to control execution of the auxiliary FSP components in response to a platform reset vector.

Example 24 includes the computer-readable medium as defined in example 23, wherein the instructions, when executed, further cause the processor to identify available platform resources associated with respective ones of the auxiliary FSP components.

Example 25 includes the computer-readable medium as defined in example 24, wherein the instructions, when executed, further cause the processor to reduce a boot duration of the platform by bypassing one of the respective ones of the auxiliary FSP components when respective ones of the available platform resources are available.

Example 26 includes the computer-readable medium as defined in example 24, wherein the instructions, when executed, further cause the processor to invoke one of the respective ones of the auxiliary FSP components when respective ones of the available platform resources are unavailable.

Example 27 includes the computer-readable medium as defined in example 23, wherein the instructions, when executed, further cause the processor to control an execution order of the auxiliary FSP components during platform boot.

Example 28 includes the computer-readable medium as defined in example 23, wherein the instructions, when executed, further cause the processor to verify compatibility between respective ones of the auxiliary FSP components and a platform processor.

Example 29 includes the computer-readable medium as defined in example 23, wherein the instructions, when executed, further cause the processor to assign a processor of the platform to an alternate bit mode to facilitate stack access.

Example 30 includes the computer-readable medium as defined in example 29, wherein the instructions, when executed, further cause the processor to assign the processor to a 32-bit mode.

Example 31 includes the computer-readable medium as defined in example 23, wherein the instructions, when executed, further cause the processor to update the FSP-R component in response to a patch request.

Example 32 includes the computer-readable medium as defined in example 31, wherein the instructions, when executed, further cause the processor to authenticate an updated FSP-R component with a public key.

Example 33 includes the computer-readable medium as defined in example 32, wherein the instructions, when executed, further cause the processor to update the FIT with an updated entry for the updated FSP-R component.

Example 34 is a system to improve platform efficiency, including means for retrieving a firmware support package (FSP) reset (FSP-R) component from a platform memory, means for assigning an entry to a firmware interface table (FIT) for the FSP-R component, means for assigning respective entries to the FIT for auxiliary FSP components, and means for transferring platform control to the FSP-R component to control execution of the auxiliary FSP components in response to a platform reset vector.

Example 35 includes the system as defined in example 34, further including means for identifying available platform resources associated with respective ones of the auxiliary FSP components.

Example 36 includes the system as defined in example 35, further including means for reducing a boot duration of the platform by bypassing one of the respective ones of the auxiliary FSP components when respective ones of the available platform resources are available.

Example 37 includes the system as defined in example 35, further including means for invoking one of the respective ones of the auxiliary FSP components when respective ones of the available platform resources are unavailable.

Example 38 includes the system as defined in example 34, further including means for controlling an execution order of the auxiliary FSP components during platform boot.

Example 39 includes the system as defined in example 34, further including means for verifying compatibility between respective ones of the auxiliary FSP components and a platform processor.

Example 40 includes the system as defined in example 34, further including means for assigning a processor of the platform to an alternate bit mode to facilitate stack access.

Example 41 includes the system as defined in example 40, further including means for assigning the processor to a 32-bit mode.

Example 42 includes the system as defined in example 34, further including means for updating the FSP-R component in response to a patch request.

Example 43 includes the system as defined in example 42, further including means for authenticating an updated FSP-R component with a public key.

Example 44 includes the system as defined in example 43, further including means for updating the FIT with an updated entry for the updated FSP-R component.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to improve platform efficiency, comprising:
    a firmware support package (FSP) configuration engine to retrieve an FSP reset (FSP-R) component from a platform memory;

a firmware interface table (FIT) manager to:
assign an entry to a FIT for the FSP-R component; and
assign respective entries to the FIT for auxiliary FSP components; and
an FSP configuration engine to transfer platform control to the FSP-R component to control execution of the auxiliary FSP components in response to a platform reset vector.

2. The apparatus as defined in claim 1, further including a platform memory analyzer to identify available platform resources associated with respective ones of the auxiliary FSP components.

3. The apparatus as defined in claim 2, further including an FSP component analyzer to reduce a boot duration of the platform by bypassing one of the respective ones of the auxiliary FSP components when respective ones of the available platform resources are available.

4. The apparatus as defined in claim 2, further including an FSP component analyzer to invoke one of the respective ones of the auxiliary FSP components when respective ones of the available platform resources are unavailable.

5. The apparatus as defined in claim 1, wherein the FSP-R component is to control an execution order of the auxiliary FSP components during platform boot.

6. The apparatus as defined in claim 1, further including an FSP component analyzer to verify compatibility between respective ones of the auxiliary FSP components and a platform processor.

7. The apparatus as defined in claim 1, wherein the FSP-R component is to assign a processor of the platform to an alternate bit mode to facilitate stack access.

8. The apparatus as defined in claim 7, wherein the alternate bit mode includes a 32-bit mode.

9. The apparatus as defined in claim 1, further including an FSP patch manager to update the FSP-R component in response to a patch request.

10. The apparatus as defined in claim 9, further including an FSP authentication manager to authenticate an updated FSP-R component with a public key.

11. The apparatus as defined in claim 10, further including an FSP/FIT interface to update the FIT with an updated entry for the updated FSP-R component.

12. A method to improve platform efficiency, comprising:
retrieving, with an instruction executed by a processor, a firmware support package (FSP) reset (FSP-R) component from a platform memory;
assigning, with an instruction executed by the processor, an entry to a firmware interface table (FIT) for the FSP-R component;
assigning, with an instruction executed by the processor, respective entries to the FIT for auxiliary FSP components; and
transferring, with an instruction executed by the processor, platform control to the FSP-R component to control execution of the auxiliary FSP components in response to a platform reset vector.

13. The method as defined in claim 12, further including identifying available platform resources associated with respective ones of the auxiliary FSP components.

14. The method as defined in claim 13, further including reducing a boot duration of the platform by bypassing one of the respective ones of the auxiliary FSP components when respective ones of the available platform resources are available.

15. The method as defined in claim 13, further including invoking one of the respective ones of the auxiliary FSP components when respective ones of the available platform resources are unavailable.

16. The method as defined in claim 12, further including controlling an execution order of the auxiliary FSP components during platform boot.

17. The method as defined in claim 12, further including verifying compatibility between respective ones of the auxiliary FSP components and a platform processor.

18. The method as defined in claim 12, further including assigning a processor of the platform to an alternate bit mode to facilitate stack access.

19. The method as defined in claim 18, wherein the alternate bit mode includes a 32-bit mode.

20. The method as defined in claim 12, further including updating the FSP-R component in response to a patch request.

21. The method as defined in claim 20, further including authenticating an updated FSP-R component with a public key.

22. The method as defined in claim 21, further including updating the FIT with an updated entry for the updated FSP-R component.

23. At least one tangible computer-readable storage medium comprising instructions which, when executed, cause a processor to at least:
retrieve a firmware support package (FSP) reset (FSP-R) component from a platform memory;
assign an entry to a firmware interface table (FIT) for the FSP-R component;
assign respective entries to the FIT for auxiliary FSP components; and
transfer platform control to the FSP-R component to control execution of the auxiliary FSP components in response to a platform reset vector.

24. The at least one tangible computer-readable storage medium as defined in claim 23, wherein the instructions, when executed, further cause the processor to identify available platform resources associated with respective ones of the auxiliary FSP components.

25. The at least one tangible computer-readable storage medium as defined in claim 24, wherein the instructions, when executed, further cause the processor to reduce a boot duration of the platform by bypassing one of the respective ones of the auxiliary FSP components when respective ones of the available platform resources are available.

* * * * *